United States Patent
West et al.

(10) Patent No.: US 9,080,610 B1
(45) Date of Patent: Jul. 14, 2015

(54) VORTEX SUPPRESSION FAIRINGS

(75) Inventors: William Andrew West, Friendswood, TX (US); Donald Wayne Allen, Richmond, TX (US); Dean Leroy Henning, Richmond, TX (US)

(73) Assignee: VIV Solutions LLC, Richmond, TX (US)

(*) Notice: Subject to any disclaimer, the term of this patent is extended or adjusted under 35 U.S.C. 154(b) by 937 days.

(21) Appl. No.: 13/278,033

(22) Filed: Oct. 20, 2011

Related U.S. Application Data (60) Provisional application No. 61/455,458, filed on Oct. 21, 2010, provisional application No. 61/428,995, filed on Dec. 31, 2010.

(51) Int. Cl.
*E02D 5/60* (2006.01)
*F16D 1/10* (2006.01)

(52) U.S. Cl.
CPC ... *F16D 1/10* (2013.01); *E02D 5/60* (2013.01)

(58) Field of Classification Search
CPC ....... B63B 2021/504; E02D 5/60; F15D 1/10; F15B 7/0406
See application file for complete search history.

(56) References Cited

U.S. PATENT DOCUMENTS

| | | | | | |
|---|---|---|---|---|---|
| 4,474,129 | A | * | 10/1984 | Watkins et al. | 114/243 |
| 5,435,667 | A | * | 7/1995 | Strange | 405/216 |
| 6,048,136 | A | * | 4/2000 | Denison et al. | 405/211 |
| 6,223,672 | B1 | * | 5/2001 | Allen et al. | 114/243 |
| 6,896,447 | B1 | * | 5/2005 | Taquino | 405/216 |
| 2007/0104542 | A1 | * | 5/2007 | Somerville et al. | 405/224.1 |
| 2008/0025800 | A1 | * | 1/2008 | Watkins | 405/216 |
| 2008/0236469 | A1 | * | 10/2008 | Masters et al. | 114/243 |
| 2012/0006053 | A1 | * | 1/2012 | Allen et al. | 62/611 |

* cited by examiner

*Primary Examiner* — Benjamin Fiorello
(74) *Attorney, Agent, or Firm* — Blakely Sokoloff Taylor & Zafman LLP (57) ABSTRACT

An apparatus including a suppression device dimensioned to suppress a vortex induced vibration of a tubular. The apparatus further including an adjustable strap assembly attached to the suppression device, the adjustable strap assembly dimensioned to secure the suppression device to the tubular. Alternatively, the apparatus may include a support arm extending from the suppression device to rotatably attach the suppression device to the tubular, the support arm having a guide member at one end dimensioned to be received by a slot formed around an outer surface of the tubular. A method including positioning a suppression device dimensioned to suppress a vortex induced vibration of a tubular against the tubular and attaching the suppression device to the tubular such that the suppression device is movable about the tubular.

9 Claims, 12 Drawing Sheets

VORTEX SUPPRESSION FAIRINGS

CROSS-REFERENCE TO RELATED APPLICATIONS

The application claims the benefit of the earlier filing date of U.S. Provisional Patent Application No. 61/455,458, filed Oct. 21, 2010 and U.S. Provisional Patent Application No. 61/428,995, filed Dec. 31, 2010 and incorporated herein by reference.

FIELD

Suppression devices and attachment assemblies for attaching the suppression device to a tubular.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. While helical strakes, if properly designed, can reduce the VIV fatigue damage rate of a tubular in an ocean current, they typically produce an increase in the drag on the tubular and hence an increase in deflection. Thus, helical strakes can be effective for solving the vibration problem at the expense of worsening the drag and deflection problem.

A better solution is to use fairings as the VIV suppression device. A properly designed fairing can reduce both the VIV and the drag. A problem associated with fairings on drilling risers has been the cost of installation and retrieval of the fairings. If the fairings are excessively large, then handling difficulties can produce long installation times. Sometimes, the economics are such that running the riser without fairings has a higher expected return value than installing the fairings due to these high installation costs.

Tail fairings are suppression devices that produce reduction in both VIV and drag, but are lighter and faster to install than traditional full fairings. These fairings consist of only the tail portion of a fairing together with straps at each end to hold the tail to the tubular.

Tail fairings, while faster to install than traditional full fairings, can be difficult to install when the brackets and straps do not line up correctly. In addition, tail fairings cannot be used for multiple sized risers, and must be used only for the buoyancy size for which they were designed. Tail fairings also typically require at least one collar per fairing to keep them from sliding down the tubular.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1:
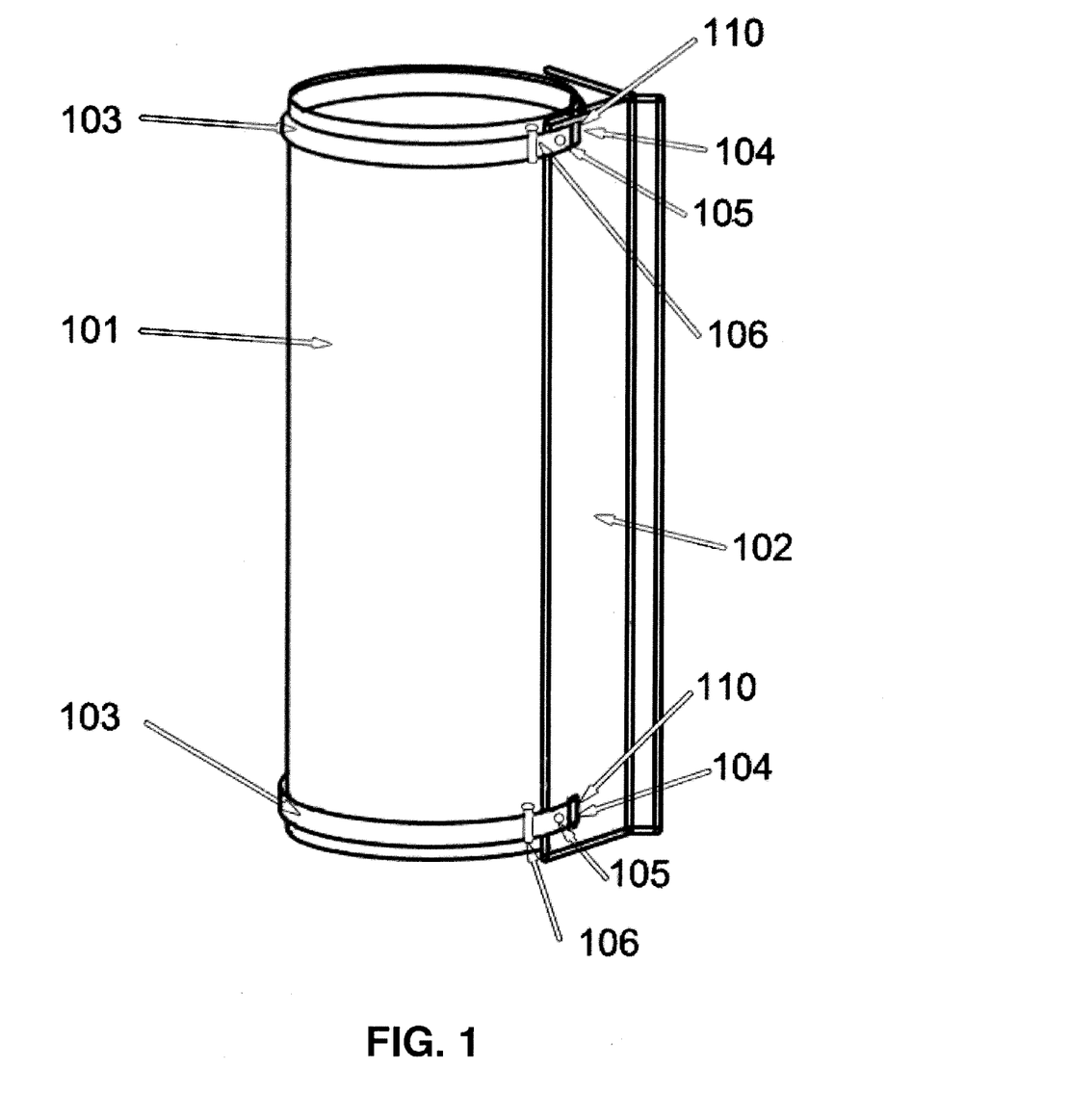
FIG. 1 illustrates a perspective view of an attachment assembly for attaching a suppression device to a tubular.

FIG. 1 illustrates a perspective view of a strap for holding a VIV suppression device in place around a tubular. VIV suppression device 102 is held in place around tubular 101 by straps 103. Straps 103 are attached at each end to opposite sides of VIV suppression device 102. In this aspect, straps 103 encircle tubular 101 and hold VIV suppression device 102 against tubular 101. Straps 103 have a length sufficient to allow VIV suppression device 102 to weathervane around tubular 101. In the illustrated embodiment, VIV suppression device 102 is shown as a substantially triangular shaped tail fairing. It is contemplated, however, that VIV suppression device may be any type of VIV suppression device capable of producing a reduction in VIV. For example, suppression device 102 may be a helical strake, a fairing, a splitter plate, or any other device where it is desirable for the device to have some rotational capability around tubular 101.

Brackets 104 are attached to suppression device 102 to facilitate attachment of straps 103 to suppression device 102. In one embodiment, one or more of brackets 104 are attached to suppression device 102 with a pin 105 inserted through each of brackets 104 and straps 103. In some embodiments, straps 103 may include hinges 106 positioned at one or more locations on straps 103.

Hinges 106 allow straps 103 to bend making straps 103 easier to install into a receptacle or bracket 104 and/or brought into the desired position for attachment to the suppression device 102. Hinges 106 may be located at both sides of each of straps 103 and/or may also be located near the midpoint between the two ends of the straps 103. Hinges 106 may also allow one end of each of straps 103 to be pre-attached to suppression device 102 before installation offshore, so that only one connection with pins 105 into brackets 104, or other attachment, is required offshore. It is contemplated that any number of hinges 106 may be used to allow sufficient freedom of movement of straps 103 so that the straps 103 may easily be attached to suppression device 102. Hinges 106 may be made of any material suitable for use in seawater and with sufficient toughness to withstand offshore installation. For example, hinges 106 may be made of metal such as stainless steel, aluminum, or copper; thermoplastic, fiberglass; or any materials subsequently discovered. Hinges 106 may be molded into straps 103, fastened to the straps 103 via bolts, screws, clamps, rivets, chemical bonding agents, or attached by any other suitable means sufficient to withstand a marine environment. Hinges 106 may be external to straps 103 or internal to straps 103.

In some embodiments, recesses 110 dimensioned to receive strap 103 are molded into suppression device 102. Brackets 104 may be positioned within recesses 110 and straps 103 attached to brackets 104 within recesses 110 using pins 105 as previously discussed. Representatively, when one of straps 103 is inserted into one of recesses 110, pin 105 is inserted into suppression device 102 and through strap 103 and bracket 104 to retain strap 103 in position. Alternatively, brackets 104 may be positioned over straps 103 positioned within recesses 110 to hold straps 103 in place. Recesses 110 may be, for example, from about 3 inches to about 5 inches tall, for example about 4 inches tall. Recesses 110 may be from about 3 to about 6 inches deep, for example, about 4 or 5 inches deep. The tolerance between the straps 103 and recesses 110 is somewhat close, so that the straps 103 do not sag or bind on the tubular 101. Pins 105 must fully and tightly engage brackets 104, suppression device 102, and straps 101. In this aspect, in some embodiments, pins 105 may be O-rings to ensure a tight fit. Alternatively, any type of pin like structure may be used to ensure a tight fit, for example, a nut and bolt.

One advantage of having recesses 110 molded into the suppression device 102 is that the amount of external hardware required for the straps 103 to attach to suppression device 102 is minimized. If straps 103 are attached externally to suppression device 102, an entire bracket assembly must be fabricated and the stresses on pins 105 are increased. Still further, if the dimensions of tubular 101 are consistent along the tubular, then use of recesses 110 in suppression device 102 can eliminate the need for a bracket or elaborate attachment mechanism.

Suppression device 102 may be made of plastic, but may also be made of other materials such as wood, fiberglass, composite materials, or even metals such as stainless steel. Straps 103 may be made of any material providing sufficient stiffness. Representatively, if straps 103 are too stiff it is difficult to engage with recesses 110 in suppression device 102. If straps 103 are too soft they may bind when the suppression device 102 needs to weathervane around tubular 101 due to changes in the ocean current direction. In this aspect, straps 103 may be made from plastic but can be made from other materials such as fiberglass or metals in the form of a chain. Brackets 104 can be made of metals such as stainless steel, plastic, composite material, wood, or any material capable of providing sufficient stiffness and strength.

Figure 2:
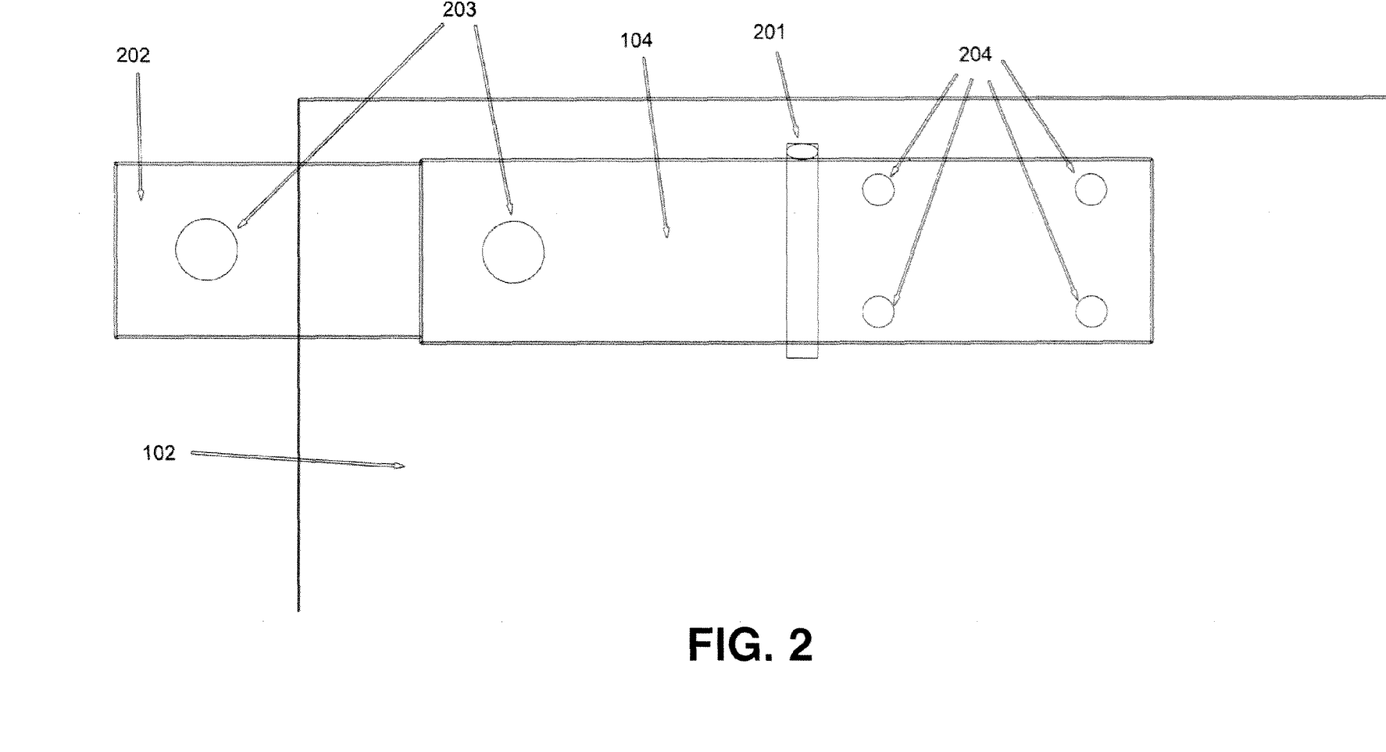
FIG. 2 is an expanded view of the brackets described in reference to FIG. 1.

FIG. 2 is an expanded view of the brackets described in reference to FIG. 1. From this view, it can be seen that bracket 104 includes bolts or other fasteners 204 that attach the back of bracket 104 to suppression device 102. Bracket 104 has hinge 201 that allows the section of bracket 104 on a side of hinge 201 opposite fasteners 204 (the free end) to rotate. In particular, this portion of bracket 104 can be rotated towards strap 103 so as to allow easier installation of strap 103.

Bracket 104 also includes an extension member 202 that allows bracket 104 to be lengthened. In this aspect, suppression device 102 can accommodate different strap lengths or variations in the diameter of the tubular to which the suppression device 102 is installed.

One advantage of adjustable bracket 104 is that it can accommodate the diameter of a tubular that varies significantly over its length or when the fabrication of the strap length is inconsistent. Another advantage of adjustable bracket 104 is that the system can be very fast to install, since extension member 202 may be rotated and extended to best fit the strap. Extension member 202 of bracket 104 can be attached to suppression device 102 with fasteners, for example fasteners 204. Extension member 202 may increase or decrease the length of bracket 104 to accommodate straps of varying lengths. In addition, extension member 202 may rotate at hinge 201 to accommodate straps that engage suppression device 102 at various angles.

Bracket 104 may be made of a metal such as stainless steel, plastic, fiberglass, or other metals and composites. Bracket 104 may be from about 3 to about 5 inches tall, for example 4 inches tall. Bracket 104 may be from about 3 to 8 inches wide, for example, from about 5 to 6 inches wide in its neutral position. Extension member 202 can be extended or contracted within bracket 104 in a telescoping manner to modify a length of bracket 104 between a length of about 5 inches to about 13 inches, for example between about 7 and about 12 inches, depending upon the functional requirements. Hinge 201 allows the section of bracket 104 opposite fasteners 204 to rotate up to 90 degrees from its nominal position against suppression device 102, so that it can accommodate a strap that approaches suppression device 102 at a 90 degree angle with respect to the tubular.

Figure 3:
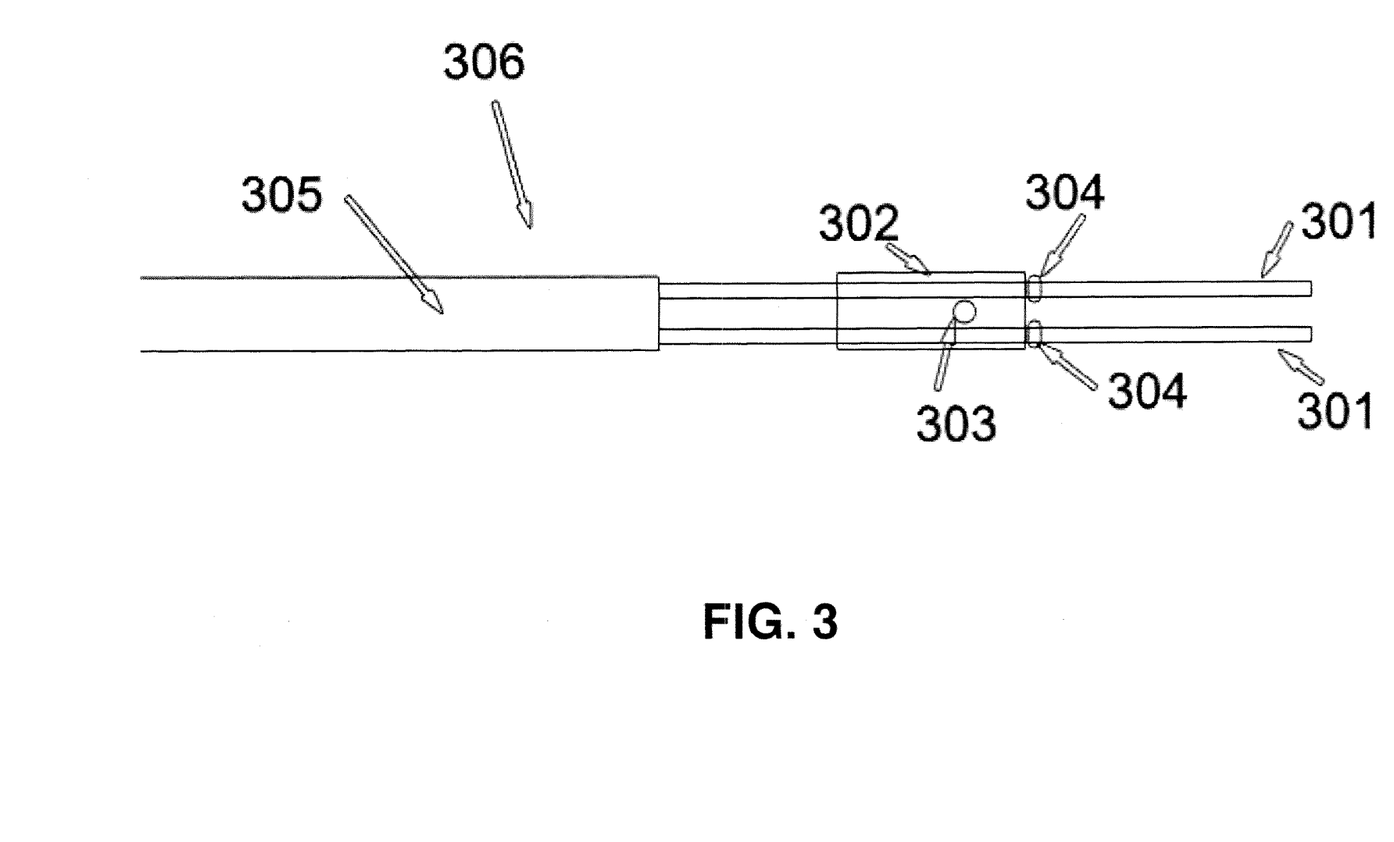
FIG. 3 illustrates an embodiment of an attachment assembly for attaching a suppression device to a tubular.

FIG. 3 illustrates an embodiment of an adjustable strap for attaching a suppression device to a tubular. Adjustable strap 305 may be used to secure a suppression device to an underlying tubular as previously discussed. In this embodiment, adjustable strap 305 includes support members 301 designed to withstand tension forces exerted on strap 305 by drag on the associated suppression device. One or more adjustable sections 302 are positioned around support members 301. Support members 301, which are attached at one end to main strap section 306, are capable of sliding within adjustable section 302. In this aspect, adjustable section 302 may include a loop type buckle assembly or other similar assembly that can guide and hold support members 301 within adjustable section 302. Adjustable section 302 is fixedly attached to the associated suppression device to secure strap 305 to the suppression device. In this aspect, adjustable section 302 may include an opening 303 through which a pin or bolt may be inserted to fasten adjustable section 302 to the suppression device. One or more cable stops 304 are used to set the desired length of strap 305 by clamping them onto support members 301 thereby restricting movement of support members 301 through adjustable section 302.

Strap 305 may be constructed in serial sections, with a portion used for the main strap section 306 and then fastening support members 301 for adjustable sections 302 to main strap section 306. Alternatively, support members 301 can run the entire strap length with both main strap section 306 and adjustable strap section 302 attached to the support members 301. To fix the strap length upon installation, clamps such as cable stops 304 may be used or support members 301 may be attached to each other or to the tail in such as way as to prevent further change to the location of adjustable section 302.

Main strap section 306 and adjustable section 302 may be made of any suitable material capable of providing the proper level of stiffness and suitable for use in seawater. Support members 301 may be made of synthetic or wire rope, chain, or cable. Support members 301 may be attached to main strap section 306 and adjustable section 302 by fasteners such as screws, bolts, and rivets. Alternatively, support members 301 may be located interior to main strap section 306 and adjustable section 302 so that they combine to form a composite strap 305.

An overall length of strap 305 will typically be large enough to provide an annulus between strap 305 and the underlying tubular sufficient to allow the associated suppression device to rotate around the tubular freely but not so large as to cause large sagging of strap 305, which could produce binding of strap 305 when the suppression device tries to weathervane due to changes in the ocean current direction. Representatively, the annulus may be between ½ inch and 1½ inches. Strap 305 must be strong enough to withstand the tension forces produced by drag on the suppression device from the ocean current. It is also important that strap 305 does not stretch significantly as this can cause the suppression device to move downstream away from the tubular which can reduce the effectiveness of the fairing system. Representatively, strap 305 is designed to accommodate tensions ranging from 0 lb to 300 lb of tension.

Figure 4A:
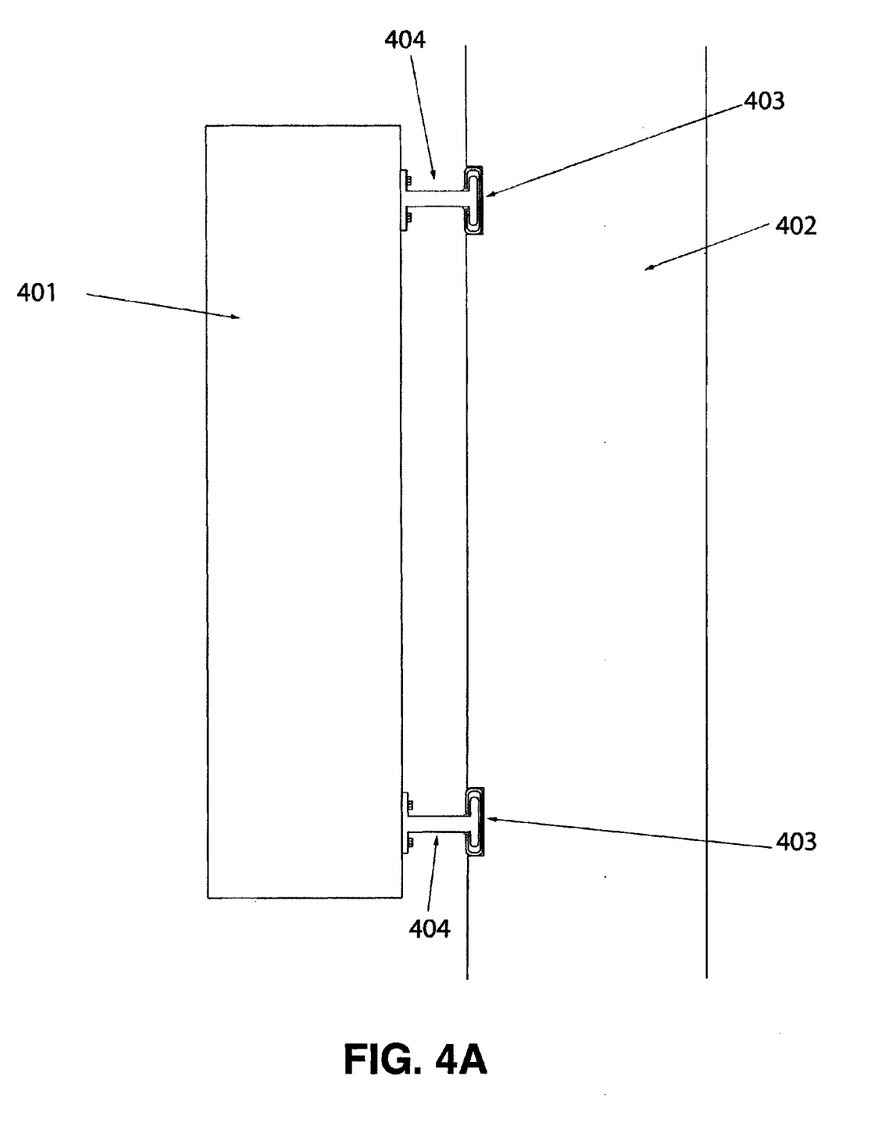
FIG. 4A illustrates a side view of an embodiment of an attachment assembly for attaching a suppression device to a tubular.

FIG. 4A illustrates a side view of an embodiment of an attachment assembly for securing a suppression device to a tubular. In this embodiment, straps are omitted and instead, suppression device 401 is attached to tubular 402 by support arms 404 which can be inserted within complimentary slots 403 formed along an exterior of tubular 402. Slots 403 may extend around all or part of the circumference of tubular 402 such that suppression device 401 is free to rotate around tubular 402 as support arms 404 slide within slots 403 around tubular 402. Other hardware may be present in slots 403 to assist with rotation of suppression device 401 around tubular 402.

Slots 403 may be as deep and as tall as necessary to allow rotation of suppression device 401 around tubular 402. Suppression device 401 may be any type of suppression device including a helical strake, a fairing, a splitter plate, or any other device where it is desirable for the device to have some rotational capability around tubular 402. Slots 403 may be rectangular, elliptical, round, trapezoidal, or of any suitable shape in cross section suitable to receive and hold ends of support arms 404 within slots 403. Support arms 404 may be made of a single piece structural member or consist of a multitude of structural members that allow suppression device 401 to be maintained in position when ends of support arms 404 are inserted into slots 403. Representatively, support arms 404 may be "I", "T" or "L" shaped structures. Bracket 404 may be attached to suppression device 401 by mechanical means such as nuts and bolts, or by chemical bonding, welding, or any other suitable methods.

Tubular 402 may be made of metal (such as steel or aluminum), fiberglass or other composite structure, plastic, wood, or any suitable material. In some embodiments, tubular 402 may be a bundle of tubulars such as umbilicals, and does not have to be round. Tubular 402 may have an outer component such as buoyancy, insulation, or other material. Slots 403 may be formed within the outer component or formed within tubular 402. The outer component can be present solely to contain the slot or it may have one or more other purposes such as providing buoyancy or thermal insulation. Support arms 404 may be made of metal (such as stainless steel or Inconel), fiberglass, plastic, or other synthetic or composite materials.

Figure 4B:
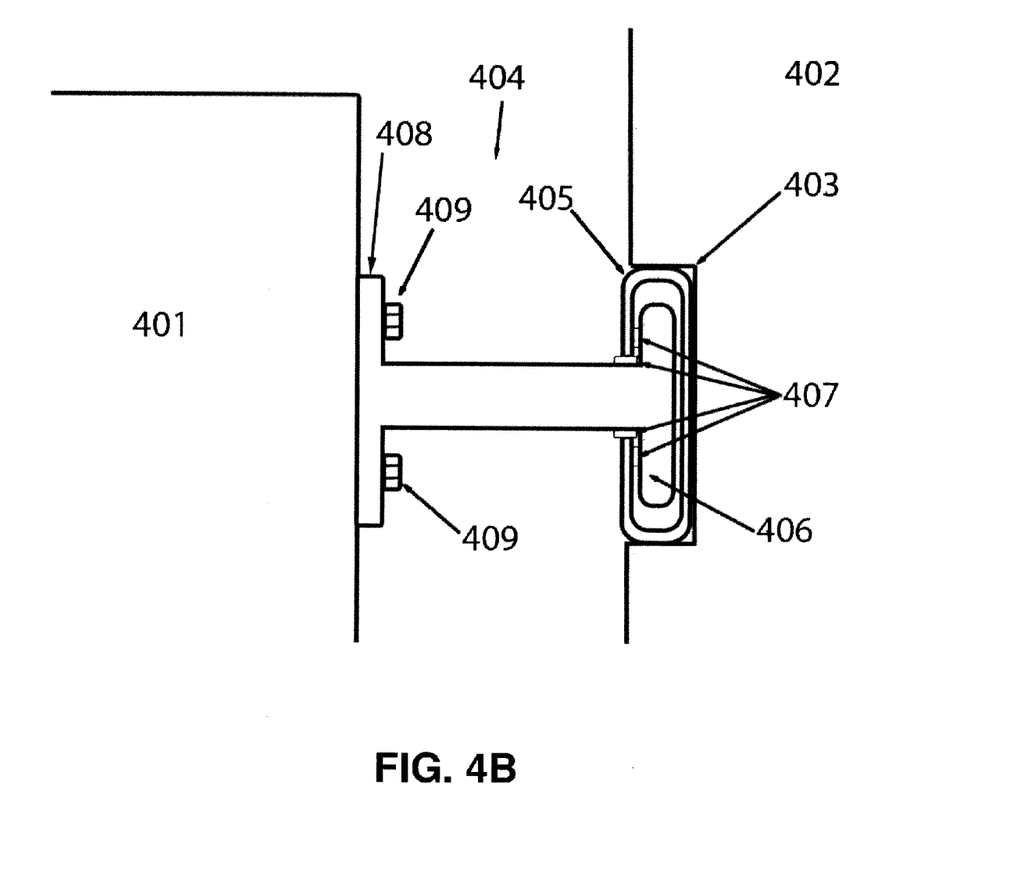
FIG. 4B illustrates an expanded view of one of the support arms and slots illustrated in FIG. 4A.

FIG. 4B illustrates an expanded view of one of the support arm and slots illustrated in FIG. 4A. Although a single slot and support arm are described, it is contemplated that the following description may apply to each of the slots and support arms illustrated in FIG. 4A. From this view, it can be seen that track 405 may be inserted into slot 403 to contain guide member 406, which extends from an end of support arm 404. Track 405 may be, for example, a bracket type assembly dimensioned to fit within slot 403 and receive guide member 406. Optional anti-friction pads 407 may be located on guide member 406 to facilitate sliding of guide member 406 within slot 403. An end of support arm 404 opposite guide member 406 may include a plate member 408 dimensioned to be attached to suppression device 401 by fastening members 409.

Slot 403 is dimensioned to keep track 405 from sliding axially along the length of tubular 402. Since guide member 406 is attached to suppression device 401 and inserted into track 405, this also keeps suppression device 401 from sliding axially along the length of tubular 402. Anti-friction pads 407 reduce the friction between guide member 406 and track 405 so that the system remains as free to rotate as possible. A roller guide or any other suitable guide that produces low friction can be used in addition to or instead of guide member 406. Similarly, a rail or other track device can be substituted for track 405. An example would be a rail with a T-shaped cross section and a guide member 406 with a cross section similar to the C-shaped track 405 of FIG. 4B. While track 405 is shown having a substantially C-shaped profile, it can be made of any suitable shape that is able to contain guide member 406. Optional anti-friction pads 407 may be positioned within track 405 at various locations depending upon the shape of track 405.

Track 405, guide member 406, support arm 404, and fasteners 409 may be made of metals such as steel, aluminum, copper, or Inconel; fiberglass or other composite structures, plastic, or any other suitable material. Anti-friction pads 407 may be made of Teflon or any other suitable low-friction material. Fasteners 409 may consist of mechanical fasteners such as bolts or screws, chemical bonding, welding, or any other suitable fastening mechanism. Guide member 406 may be fastened to support arm 404 or integrally formed with support arm 404 as a custom bracket with a T-shaped or I-shaped cross section.

Figure 4C:
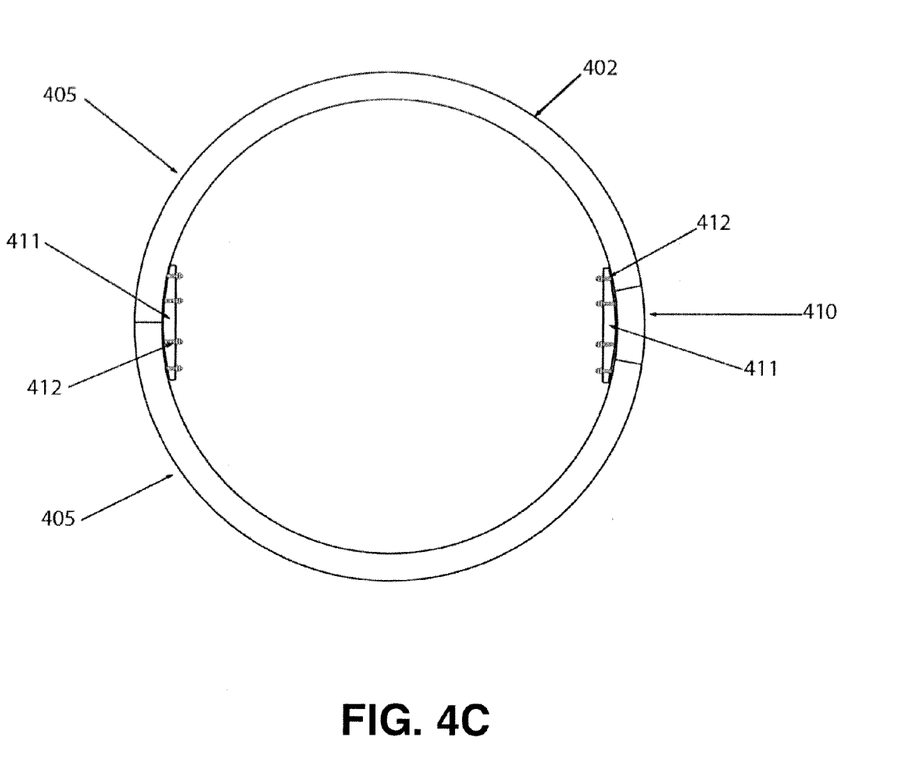
FIG. 4C illustrates a top view cross-section of the track illustrated in FIG. 4A.

FIG. 4C illustrates a top view cross-section through track 405 positioned around tubular 402. From this view, it can be seen that removable section 410 is attached to track 405 and can be removed to facilitate insertion of guide member 406 into track 405. Since track 405 is typically quite stiff, it must be made in multiple sections in order to place it in slot 403 formed around tubular 402. In this aspect, connecting brackets 411 may be used to connect adjacent sections of track 405 as well as removable section 410. Connection brackets 411 are connected to track 405 or removable section 410 by fasteners 412.

Once the sections of track 405 are placed around tubular 402, they may be connected to connecting brackets 411 by fasteners 412. After guide members 406 of suppression device 404 are inserted into track 405, removable section 410 may be attached to connection bracket 411 to complete the circuit for track 405. Track 405 does not have to necessarily make a complete loop around tubular 402 but it is shown as a complete loop in FIG. 4C. Track 405 does not have to be round and can be made of any shape that allows the guides to traverse its length. Track 405 may consist of as many sections as desired and removable section 410 may be of any suitable size. Similarly connecting brackets 411 may be made of any suitable size and shape. Fasteners 412 may consist of mechanical fasteners such as bolts or screws, chemical bonding, welding, a combination of one or more means, or by any suitable fastener method. More than one removable section 410 may be used for inserting the guides, or for any other desired reason such as inserting auxiliary lines in a drilling riser.

Figure 5:
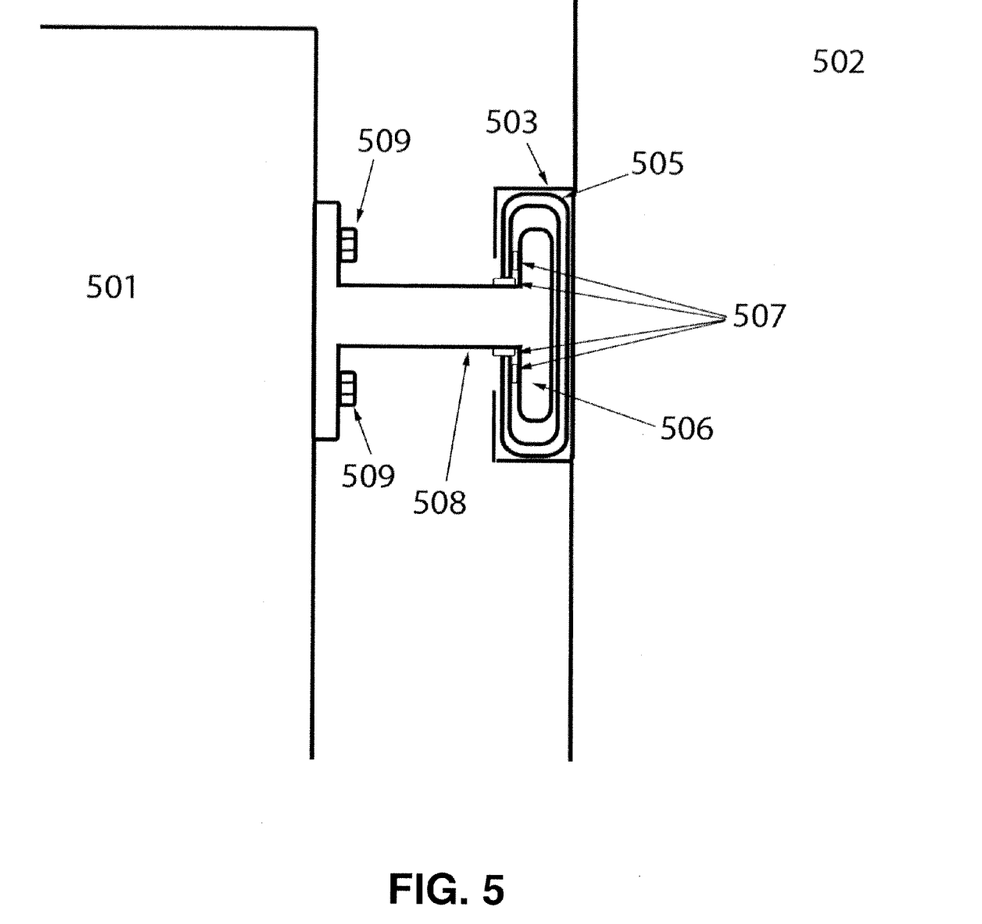
FIG. 5 illustrates a side view of an embodiment of an attachment assembly for attaching a suppression device to a tubular.

FIG. 5 illustrates a side view of an embodiment of an attachment assembly for securing a suppression device to a tubular. Suppression device 501, support arm 504 and slot 503 are substantially the same as suppression device 401, support arm 404 and slot 403 described in reference to FIG. 4A except that in this embodiment, slot 503 having track 505 therein are external to tubular 502. Guide member 506 and support arm 504 are used to hold suppression device 501 in place along slot 503 formed around tubular 502. Fasteners 509 may be used to attach support arm 504 to suppression device 501 and anti-friction pads 507 can be used to reduce the friction on guide member 506 as it travels along track 505. Track 505 and/or slot 503 may be attached to tubular 502 by any suitable means. Although slot 503 and track 505 are shown completely exterior to tubular 502, it is contemplated that slot 503 may be interior, exterior, or both interior and exterior to tubular 502.

Figure 6:
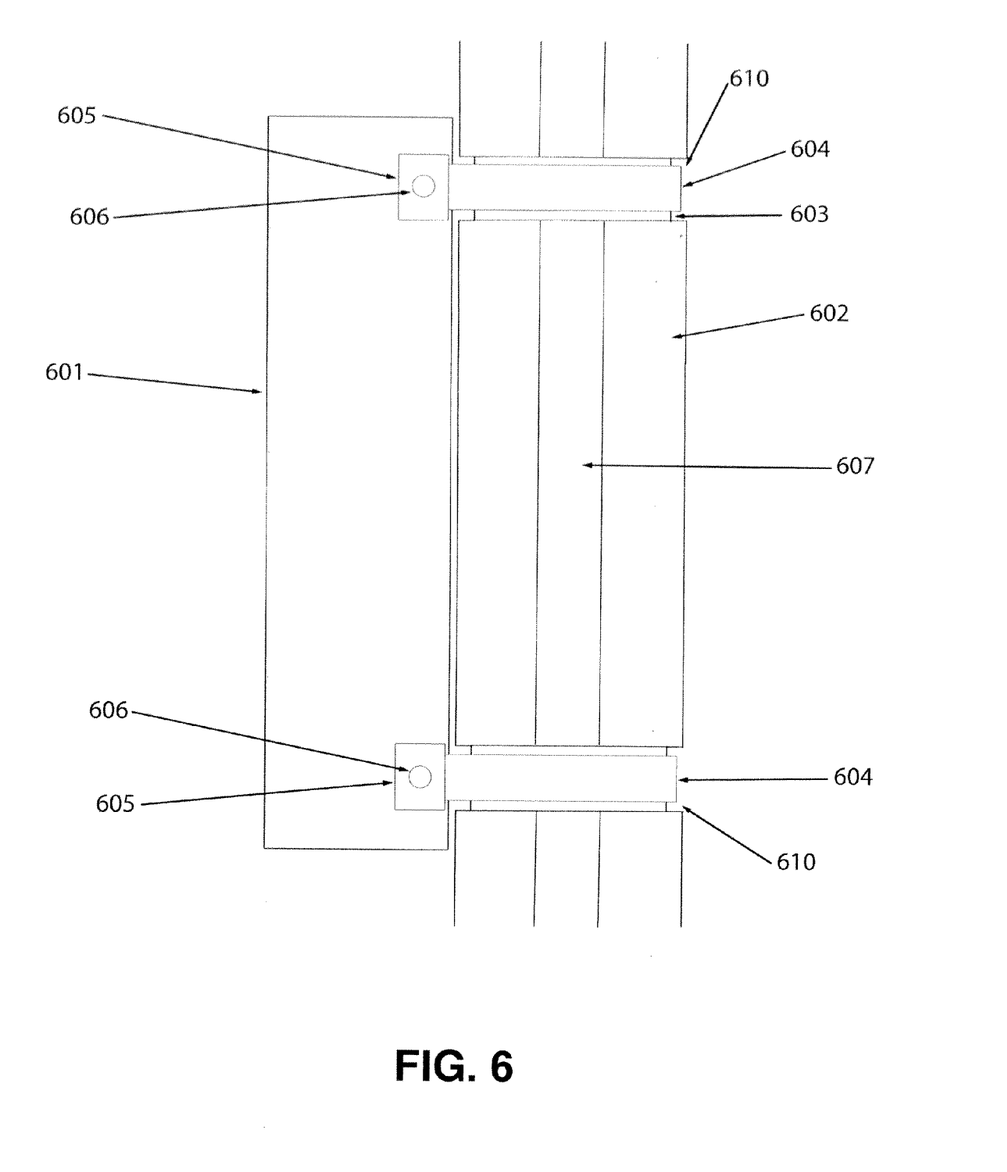
FIG. 6 illustrates a side view of another embodiment of an attachment assembly for attaching a suppression device to a tubular.

FIG. 6 illustrates a side view of another embodiment of an attachment assembly for securing a suppression device to a tubular. Suppression device 601 may be any type of suppression device such as those previously discussed. Straps 604 may encircle tubular 603 and be attached to suppression device 601 at their ends by brackets 605 and fasteners 606 to secure suppression device 601 to tubular 603. Tubular 603 may have an exterior sleeve 602 that encircles tubular 603, to for example, provide buoyancy or insulate tubular 603. Sleeve 602 may be substantially cylindrical or sleeve 602 may have flat sections 607 such as the flat section on drilling riser buoyancy. Channels 610 may be formed within an outer surface of sleeve 602. Channels 610 may be dimensioned to receive straps 604.

Straps 604 may be dimensioned to keep suppression device 601 sufficiently close to tubular 603 so as to optimize the performance of suppression device 601. Suppression device 601 must be held close enough to tubular 603 to keep straps 604 from being able to depart from recesses 610 formed within sleeve 602. Straps 604 must also be sufficiently loose to allow straps 604 to rotate around tubular 603 so that suppression device 601 is free to weathervane with the incoming current. Straps 604 may be made of any suitable geometry and, in some cases, are not completely round. Straps 604 can be made of any of the previously disclosed materials suitable for straps, for example, steel, Inconel, aluminum, plastic, fiberglass or other composites or may be a hybrid of several different materials.

Optional brackets 605 can be useful for attaching straps 604 to suppression device 601. Fasteners 606 attach straps 604 to brackets 605 or directly to suppression device 601. Brackets 605 can be made of any suitable geometry. Fasteners 606 can include any suitable fastening mechanisms including mechanical fasteners such as bolts or screws, chemical bonding, welding, or any other suitable mechanisms.

Figure 7:
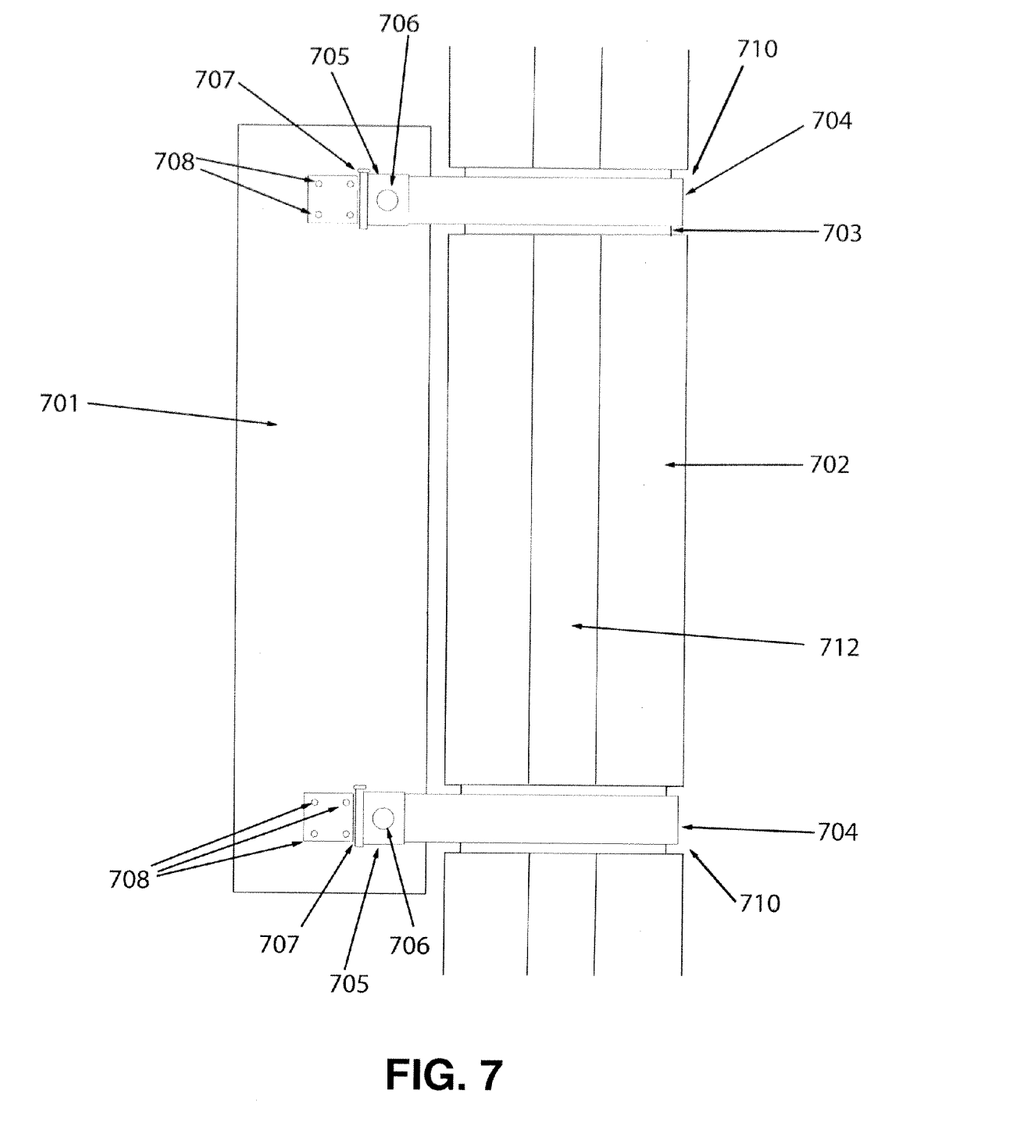
FIG. 7 is a side view of another embodiment of an attachment assembly for attaching a suppression device to a tubular.

FIG. 7 is a side view of another embodiment of an attachment assembly for securing a suppression device to a tubular. Tubular 703, suppression device 701, straps 704, brackets 705 and their associated components (e.g. fasteners 706 and 708) are substantially similar to those discussed in reference to FIG. 6 except that in this embodiment, brackets 705 include hinges 707. Hinges 707 allow for one end of straps 704 to be attached to suppression device 701 prior to final installation. During final installation, the attachment of suppression device 701 to tubular 703 may need to occur as quickly or as easily as possible and having one side of straps 704 already attached to suppression device 701 can fulfill these needs. Note that it is also possible to attach one end of straps 704 to suppression device 701 with other mechanisms such as mechanical fasteners, welding, clamping, chemical bonding or other suitable means and have a hinge somewhere along the span of straps 704 instead.

Straps 704 may be connected to brackets 705 by fasteners 706 such as those previously discussed. Brackets 705 may be attached to suppression device by additional fasteners 708. Other attachment mechanisms are also possible for attaching straps 704 to brackets 705 or hinges 707 including direct attachment of straps 704 to hinges 707 through welding or any other suitable means. In some embodiments, hinges 707 are separate from brackets and may be attached to straps 704 in the absence of brackets 705. Brackets 705 may be attached to suppression device 701 using any suitable means including welding, clamping, bolting, chemical bonding, or even molding part of the hinge into suppression device 701. Tubular 703 may have an exterior sleeve 702 that encircles tubular 703, to for example, provide buoyancy or insulate tubular 703. Sleeve 702 may be substantially cylindrical or sleeve 702 may have flat sections 712 such as the flat section on drilling riser buoyancy. Once assembled, straps 704 are positioned within channels 710 formed around tubular 703.

Figure 8:
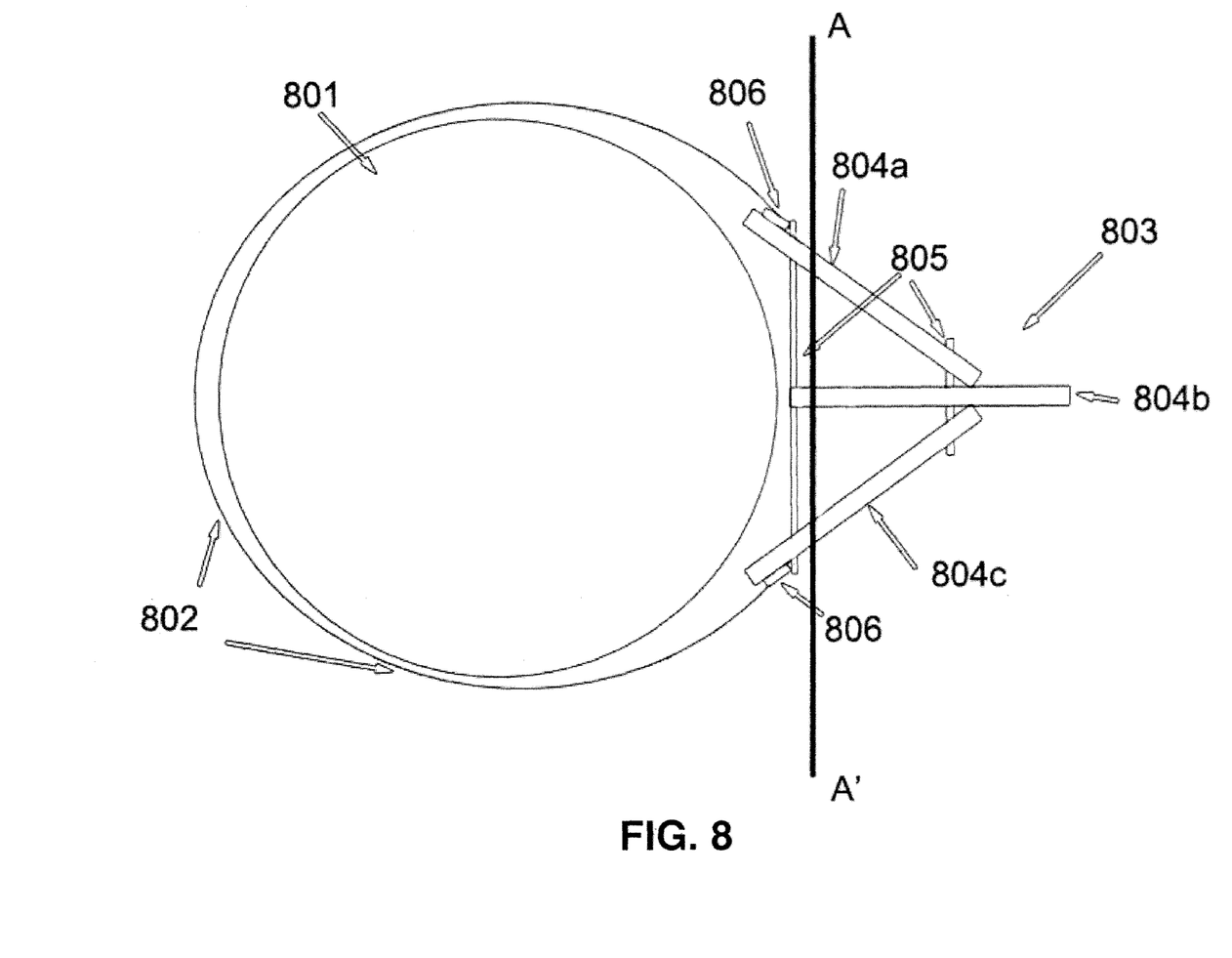
FIG. 8 illustrates a top view of an embodiment of a suppression device.

FIG. 8 illustrates an embodiment of a suppression device that may be used in connection with any of the previously disclosed assemblies for attaching a suppression device to a tubular. In this embodiment, suppression device is a tail 803. Tail 803 is constructed from plates 804a, 804b, 804c, which are separated and attached to each other by structural members 805. Strap 802 is attached to tail 803 by any suitable attachment mechanism (e.g. bolts, welding, etc.) at attachment locations 806. In some embodiments, ends of straps 802 are attached to tail 803 as illustrated in FIG. 8 while in other embodiments strap 802 extends through plates 804a, 804b, 804c so that tail 803 may be locked to strap 802 or free to slide along strap 802. Strap 802 and tail 803 are free to weathervane around the tubular 801. Attachment locations 806 may also be located on the side of the tail 803 that is adjacent to tubular 801.

Plates 804a, 804b, 804c may be connected to structural members 805 by welding, specialized bracket, chemical bonding or other mechanical methods. A tip of the outer plates 804a and 804c may be tapered to align flush against center plate 804b to establish a better connection and/or to improve the tail performance. Structural members 805 may be bars that pass through plates 804a, 804b, and 804c and clamps, welds, appurtenances, fasteners, chemical bonding, or other mechanisms may be used to fix plates 804a, 804b, and 804c to structural members 805 and keep them from sliding along structural members 805. Attachment locations 806 may consist of one or more of brackets, plates, pins, studs, screws, chemical bonding, bolts, nuts or other suitable fastening mechanisms.

An advantage of tail 803 having plates 804a, 804b, 804c is that plates 804a, 804b, 804c and structural members 805 may be easily constructed and require minimal molding or forming of parts. Plates 804a, 804b, 804c may be made of plastic or other materials sufficiently light in weight and suitable for seawater. Structural members 805 may be made out of plastic, stainless steel, fiberglass, composites, or other suitable materials.

Plates 804a and 804c may have a length sufficient to form an angle substantially tangent to the outer diameter of tubular 801 and should meet at plate 804b. Plate 804b has a length such that it does not contact tubular 801 at one end, however plate 804b can be as long as desired to optimize the system performance. Plate 804b may have other appurtenances on its exterior to achieve a stable performance of the fairing system. Plates 804a, 804b, 804c may have a height, for example, of from about 1 foot to about 42 feet, more preferably from about 6 feet to about 8 feet, for example 7 feet depending upon the length of the tubular joint to which they are applied. Structural members 805 may run substantially along the length of plates 804a, 804b, 804c, but may also have a relatively small cross, such as a cylindrical cross section, and simply act as connectors between adjacent plates 804a, 804b, 804c.

In some embodiments, structural members 805 may be omitted and a bracket or similar device may be used to connect plates 804a, 804b, and 804c together or strap 802 may be used to connect the plates and provide the required structural support. For example, strap 802 can pass through plates 804a, 804b, 804c, but may not require fasteners or other devices to keep them from sliding along the strap 802, since the curvature of strap 802 will often minimize sliding of plates 804a, 804b, 804c.

Figure 9:
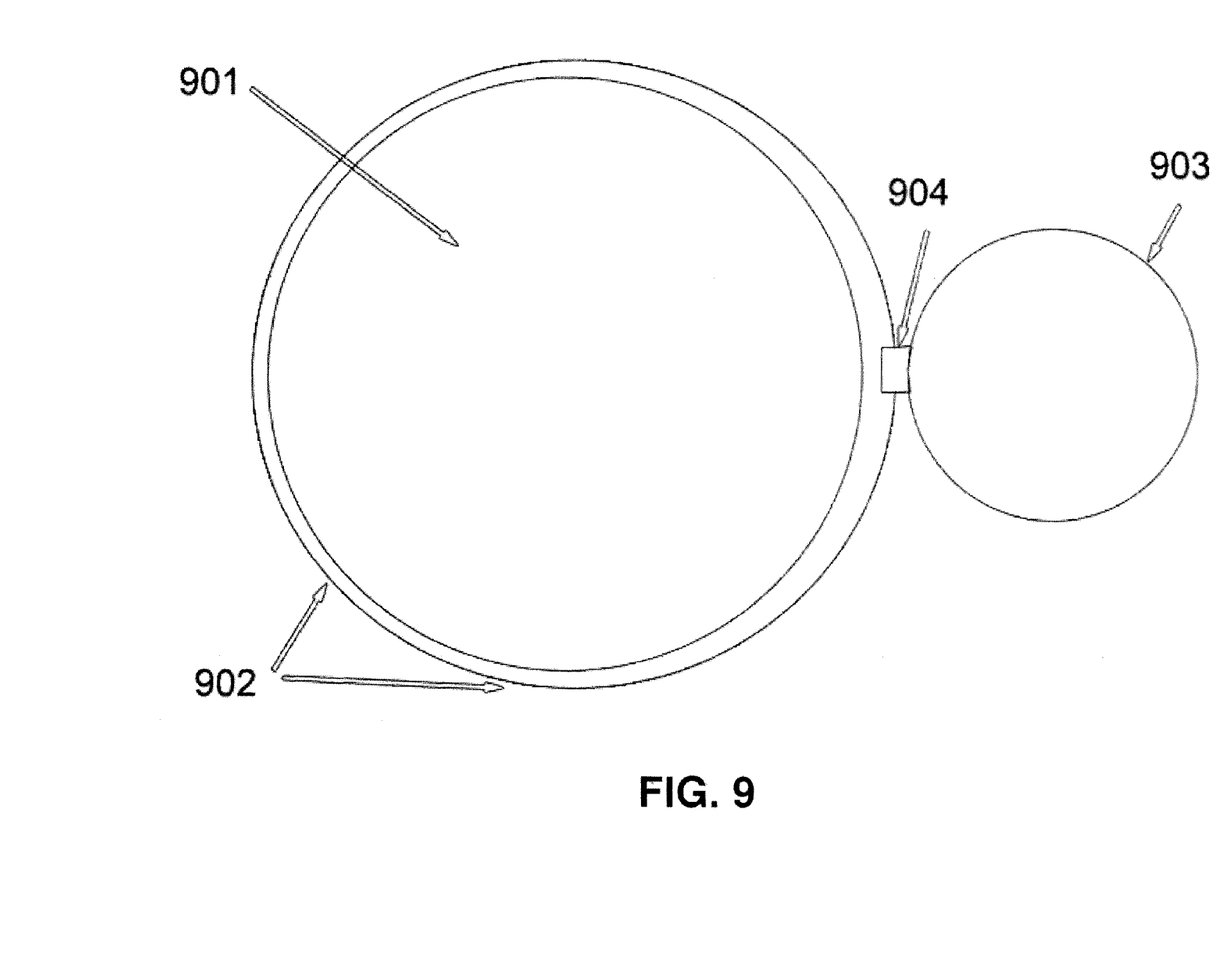
FIG. 9 illustrates a top view of another embodiment of a suppression device.

FIG. 9 illustrates a top view of another embodiment of a suppression device that may be used in connection with any of the previously disclosed assemblies for attaching a suppression device to a tubular. In this embodiment, tail 903 is connected to tubular 901 by strap 902. Strap 902 may be substantially the same as any of the previously disclosed strap configurations. Tail 903 is connected to strap 902 by any suitable fastening assembly 904 which can lock tail 903 to strap 902 or allow tail 903 to slide along strap 902 by simply passing strap 902 through fastening assembly 904. In this embodiment, tail 903 may have any non-triangular shape suitable for suppression VIV about tubular 901. Representatively, a cross section of tail 903 may be any desired shape, such as round, circular, elliptical, or polygonal, for example, a square or rectangular shape. If polygonal, the corners of the polygon may, or may not, be rounded. For example, tail 903 may be elliptical with the major axis of the ellipse directed towards fastening assembly 904. If circular, the diameter of tail 903 may be any size desired, for example, the diameter can range from 10 to 70 percent of the diameter of tubular 901.

Fastening assembly 904 may be constructed of any suitable material, for example a metal such as stainless steel, plastic, or composite material. Tail 903 may be attached to fastening assembly 904 by welding, molding, clamping, fastening, or any other suitable means. Fastening assembly 904 may consist of multiple components such as rings, plates, brackets, bearings, blocks, pulleys, pins, nuts, bolts, and other fasteners. Tail 903 may be made of plastic, metal such as stainless steel, or composite material. Tail 903 may be allowed to fill with water, or may be filled with a material to control buoyancy, such as syntactic foam or air. Strap 902 will usually be substantially circular, but can be elliptical with a ratio between the major and minor axes of the ellipse in the range of 1:1 to 4:1.

Figure 10:
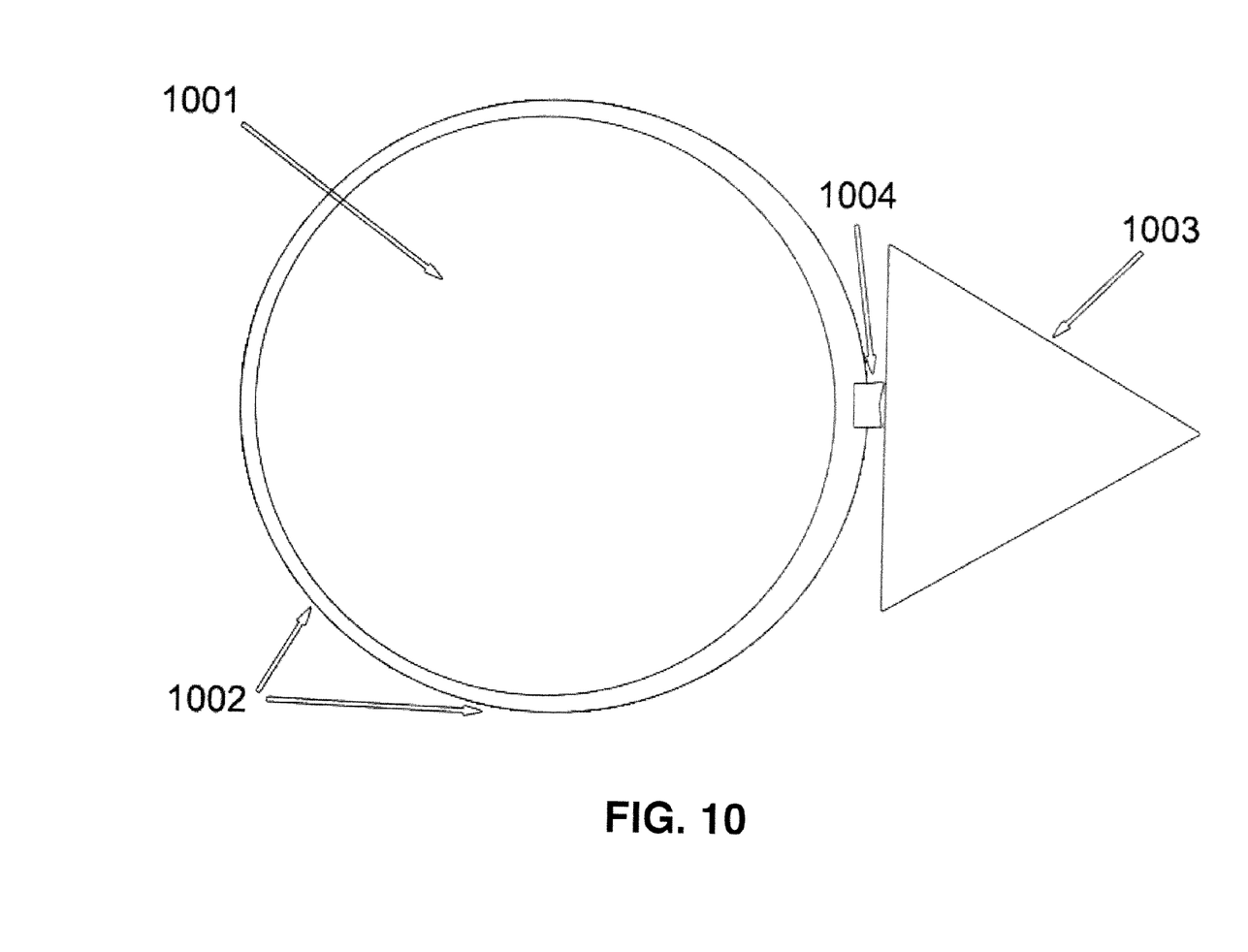
FIG. 10 illustrates a top view of another embodiment of a suppression device.

FIG. 10 illustrates a top view of another embodiment of a suppression device that may be used in connection with any of the previously disclosed assemblies for attaching a suppression device to a tubular. In this embodiment, tail 1003 is connected to tubular 1001 by strap 1002. Strap 1002 may be substantially the same as any of the previously disclosed strap configurations. According to this embodiment, a cross section of tail 1003 may be an equilateral triangle as shown, but may also be of any other triangular shape. Alternatively, the cross section will be an isosceles triangle with two equal sides that are longer than the third side, and with the two equal sides coming to a point furthest from fastening assembly 1004.

Although not illustrated, another possible cross sectional shape of tail 1003 is a rectangle, where the short side of the rectangle is attached to bracket fastening assembly 1004. This rectangular shape will typically have an aspect ratio (the ratio defined by the length of the longer sides divided by the length of the shorter sides) ranging from 1 to 5, however the rectangle can also consist of a single plate, with the rectangle defined by the plate thickness. Another possible cross sectional shape for tail 1003 may be a trapezoid. In this case, the side attached to fastening assembly 1004 will typically be longer than its opposite side, and the other two sides will be substantially equal to each other in length. The trapezoid may also have rounded corners and edges to smooth the flow past it. All tails may have appurtenances attached to them in order to improve flow quality. These appurtenances may include additional members with cross sections similar to those of tails 903, 1003 to help streamline the flow past the tail or additional members such as plates at the tip of the tail furthest from bracket 1004 to assist with weathervaning. Appurtenances may also be added to increase the size of the tail or to accommodate a different sized tubular.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. An apparatus comprising:
a suppression device dimensioned to suppress a vortex induced vibration of a tubular, wherein the suppression device is dimensioned to encircle less than an entire circumference of the tubular such that a gap is formed between opposite sides of the suppression device; and
an adjustable strap assembly dimensioned to extend across the gap, between the opposite sides of the suppression device, to secure the suppression device to the tubular, the adjustable strap assembly comprising (1) a strap having a first end and a second end, (2) a first bracket operable to mount the first end to one of the opposite sides of the suppression device, (3) a second bracket operable to mount the second end to another of the opposite sides of the suppression device, (4) an extension member positioned between the first bracket and the second bracket and (5) a hinge, the extension member operable to modify a length of the adjustable strap assembly while the first end and the second end remain mounted to the suppression device, and wherein the hinge is a separate structure from the strap that connects the strap to the bracket such that the strap is operable to rotate with respect to the suppression device.

2. The apparatus of claim 1 wherein the suppression device is formed by a plurality of plates.

3. The apparatus of claim 1 wherein the suppression device comprises a cross-sectional shape selected from one of a triangle, circle or a polygonal shape.

4. The apparatus of claim 1 wherein the tubular comprises at least one channel formed therein and dimensioned to receive the adjustable strap assembly.

5. The apparatus of claim 1 wherein the suppression device comprises a recess dimensioned to receive one of the first end or the second end of the adjustable strap assembly.

6. A method comprising:
positioning a suppression device against a tubular, wherein the suppression device is dimensioned to suppress a vortex induced vibration of the tubular, wherein the suppression device comprises a first side and a second side, and a gap between the first side and the second side through which the tubular is exposed;
attaching an adjustable strap to the suppression device, wherein attaching comprises connecting a first end of the adjustable strap to the first side of the suppression device and connecting a second end of the adjustable strap to the second side of the suppression device such that the adjustable strap extends around the portion of the tubular exposed within the gap between the first side and the second side, and wherein the adjustable strap further comprises a hinge and a bracket, wherein the hinge is a separate structure from the adjustable strap and the hinge is positioned between the first end and the second end of the adjustable strap, and wherein the hinge connects the adjustable strap to the bracket and allows the adjustable strap to rotate with respect to the suppression device, and
adjusting a length of the adjustable strap such that the suppression device is attached to the tubular and movable about the tubular.

7. The method of claim 6 the tubular comprising a recess within which the first end or the second end of the adjustable strap is positioned.

8. An apparatus comprising:
a suppression device dimensioned to suppress a vortex induced vibration of a tubular, wherein the suppression device is dimensioned to encircle less than an entire circumference of a tubular such that a gap is formed between opposite sides of the suppression device; and
an adjustable strap assembly dimensioned to extend across the gap, between the opposite sides of the suppression device, to secure the suppression device to the tubular, the adjustable strap assembly comprising (1) a first end mounted to one of the opposite sides of the suppression device, (2) a second end mounted to another of the opposite sides of the suppression device, (3) a strap extending between the first end and the second end, and (4) a bracket forming one of the first end or the second end, wherein the bracket comprises an extension member attached to the strap, and the extension member is operable to modify an overall length of the adjustable strap assembly while the first end and the second end remain mounted to the suppression device.

9. The apparatus of claim 8 wherein the suppression device comprises a polygonal shape.

\* \* \* \* \*